(12) United States Patent
Tomishima

(10) Patent No.: US 6,636,469 B2
(45) Date of Patent: Oct. 21, 2003

(54) METHOD FOR ADJUSTING THE ROTATION SPEED OF A DISK TO REDUCE ERRORS CAUSED BY DISK UNBALANCE

(75) Inventor: Yuichiro Tomishima, Sendai (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/059,690

(22) Filed: Mar. 27, 2002

(65) Prior Publication Data

US 2002/0118619 A1 Aug. 29, 2002

Related U.S. Application Data

(62) Division of application No. 09/307,049, filed on May 7, 1999, now abandoned.

(30) Foreign Application Priority Data

May 7, 1998 (JP) .......................................... 10-124364

(51) Int. Cl.[7] ............................................... G11B 7/00
(52) U.S. Cl. ............................... 369/53.14; 369/53.18; 369/53.28; 369/53.3; 369/53.37
(58) Field of Search .......................... 369/53.13, 53.14, 369/53.18, 53.23, 53.28, 53.3, 53.37

(56) References Cited

U.S. PATENT DOCUMENTS

| 5,862,113 | A | 1/1999 | Tsuyuguchi et al. |
| 5,886,966 | A | 3/1999 | Ota et al. |
| 5,893,048 | A | 4/1999 | Pate et al. |
| 6,016,296 | A | 1/2000 | Kim |
| 6,111,826 | A | 8/2000 | Minase |

Primary Examiner—W. R. Young
(74) Attorney, Agent, or Firm—Dilworth & Barrese, LLP

(57) ABSTRACT

A method for reading data from an unbalanced disk in a disk drive is disclosed. The method includes the steps of measuring a degree of unbalance of the disk while starting up a rotation of the disk, determining a suitable rotating speed for error-free reading (e.g., a maximum error-free reading speed) corresponding to the measured degree of unbalance, based on a previously stored relationship between degree of unbalance and suitable rotating speed, and beginning a reading operating while rotating the disk at the determined rotating speed. In accordance with the method, it is possible to suppress an unbalanced disk from vibrating, thereby achieving a stable data reading from the disk.

4 Claims, 4 Drawing Sheets

NORMAL DISK

UNBALANCED DISK

DRIVE VOLTAGE

METHOD FOR ADJUSTING THE ROTATION SPEED OF A DISK TO REDUCE ERRORS CAUSED BY DISK UNBALANCE

PRIORITY

This application division to an application entitled "Method For Reading Data From Unbalanced Disk" filed in the United States Patent and Trademark Office on May 7, 1999 and assigned Ser. No. 09/307,049, now abandoned; and, an application entitled "Method For Reading Data From Unbalanced Disk" filed in the Japanese Patent Office on May 7, 1998 and assigned Serial No. 124364/1998; the contents of all of which are hereby incorporated by reference.

BACKGROUND OF THE INVENTION

1. Field of the Invention

The present invention relates to an optical disk reproducing apparatus such as a CD-ROM drive, and more particularly to a method for reading data from a disk that is unbalanced at the beginning of a rotation thereof.

2. Description of the Related Art

In many cases, digital disks such as CD-ROMs or DVDs (digital versatile disks) are painted with artwork, characters or figures on the surface opposite the data-bearing surface. Due to the thickness of the painted material, a disk which is otherwise manufactured with uniform thickness, may vary in thickness. When a disk having such non-uniform thickness is read at a high speed, a surface vibrating phenomenon may occur, which results in read errors.

In association with digital disks, a degree of unbalance is defined to represent a non-uniformity in thickness. This degree of unbalance, represented by "F(N)", increases in proportion to a square of the revolution speed. That is, the degree of unbalance F(N) can be expressed by the following equation (1):

$$F(N) = mr\omega^2 F_0(N) \qquad \text{[Equation 1]}$$

mr: mass per reference area at a position spaced from the center of the disk by a distance r;

$\omega$: rotating velocity; and $F_0(N)$: a reference degree of unbalance for a disk with a reference mass and rotating at a reference rotating velocity.

Accordingly, considering in particular the trend towards ever faster data processing, there is a need for techniques to carry out successful reading of data from unbalanced disks at high speeds. The present invention addresses this need.

SUMMARY OF THE INVENTION

Accordingly, an object of the present invention is to provide a data reading method for disks which is capable of suppressing vibrations of an unbalanced disk, to thereby achieve a stable data reading operation.

The present invention provides a method for reading data from an unbalanced disk in a disk drive, including the steps of determining a maximum disk rotating speed for error-free reading, based on a degree of unbalance of the disk, and beginning a reading operation while rotating the disk at the determined maximum rotating speed.

In accordance with an embodiment of the present invention, a method for reading data from an unbalanced disk in a disk drive is provided which includes the steps of: measuring a degree of unbalance of the disk while commencing a rotation of the disk; determining a suitable rotating speed for error-free reading (e.g., a maximum error-free reading speed) corresponding to the measured degree of unbalance, based on a previously stored relationship between degree of unbalance and suitable rotating speed, and beginning a reading operation while rotating the disk at the determined rotating speed.

Since a maximum disk rotating speed for error-free reading is determined prior to the beginning of a data reading operation, an erroneous reading operation caused by an unbalance of the disk does not occur when reading subsequently begins. The subsequent reading operation can also be carried out at a rotating speed as high as possible. Also, it is possible to suppress the generation of vibrations or noise while eliminating undesirable influences on other elements.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Reference will now be made in detail to the preferred embodiments of the present invention.

Figure 1:
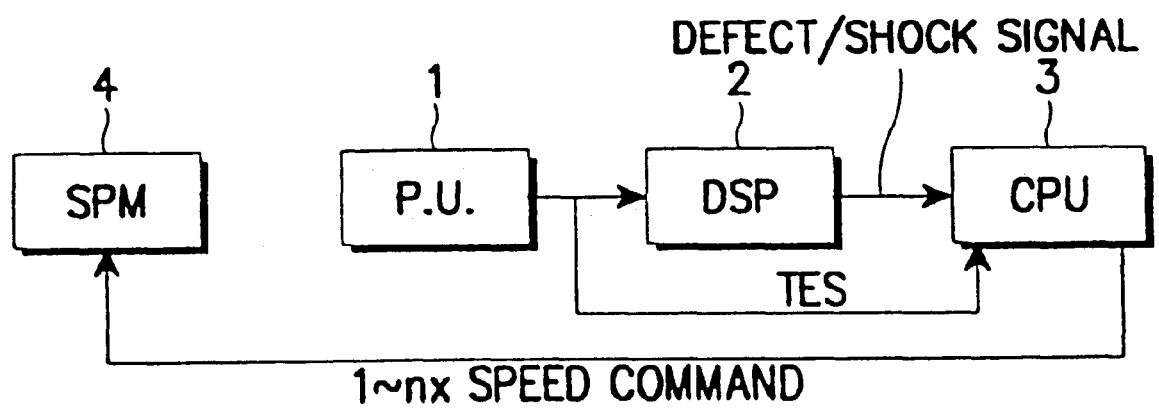
FIG. 1 is a block diagram illustrating an optical disk reproducing system in which a data reading method in accordance with the present invention may be embodied.

FIG. 1 is a block diagram illustrating an optical disk reproducing system in which a data reading method of the invention may be embodied. The system includes a pickup unit 1 for reading data pits on a disk, thereby generating a tracking error signal TES; a digital signal processor (DSP) 2 for detecting when the pickup unit strays away from pits being read; a central processing unit (CPU) 3 that detects a degree of unbalance of the disk; and a spindle motor 4 for rotating the disk at a rotation rate controlled by CPU 3.

The tracking error signal TES is a control voltage signal for the pickup unit 1 which is used to control a focusing operation of the pickup unit 1 to cope with surface vibrations occurring at the disk upon reading pits thereon. More specifically, the TES is a measure of how far the pick-up unit has strayed from the track where data is being currently read. In response to the TES, the position of the pick-up unit laser beam is dynamically controlled by means of a feedback signal generated by the CPU to keep the beam on track.

Figure 2:
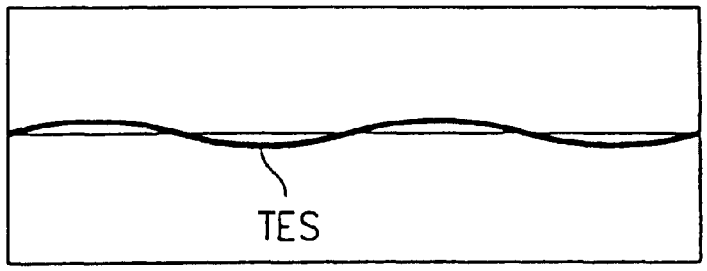
FIG. 2 is a waveform diagram illustrating a tracking error signal.
Figure 2:
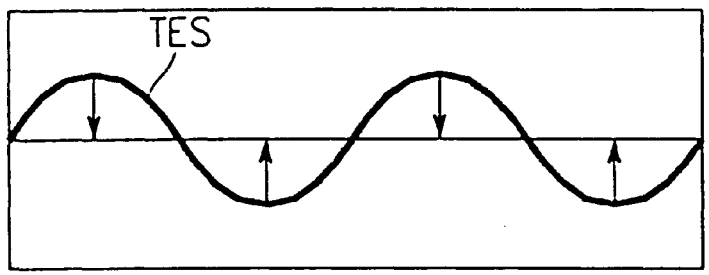
Figure 2:
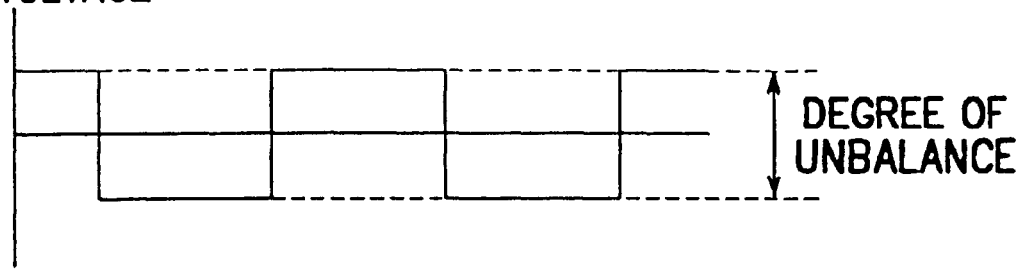

As shown in FIG. 2, such a tracking error signal TES has a small amplitude even in the case of reading a normal, balanced disk. When an unbalanced disk is read, a tracking error signal is generated which exhibits an increased amplitude, as illustrated in the figure. The tendency of such an amplitude increase in tracking error signals due to an unbalance is apparent even in a low speed reading operation. In the case of an unbalanced disk, a tracking error signal exhibiting a uniform amplitude is generated. In accordance with one aspect of the present invention, when the tracking error signal exhibits a non-periodic, abnormal amplitude, it is determined that the abnormal amplitude is not due to an unbalance of the disk, but rather, results from other factors such as defects of the disk or other external impact.

The CPU 3 monitors a drive voltage for an error correction from the tracking error signal TES. The drive voltage varies in proportion to the amplitude of the TES, and is applied to a tracking coil to correct the error of the TES. The drive voltage is determined by the CPU 3 as the amplitude of the TES signal. A degree of unbalance of the disk can be quantitatively determined from the amplitude of the drive voltage at the rotation rate used during the measurement. In the present embodiment, the degree of unbalance is determined to be the measured drive voltage. However, a TES amplitude that is non-periodic and abnormal is determined to be unrelated to a disk unbalance and is therefore ignored in the degree of unbalance determination. That is, the degree of unbalance is determined by considering periodic variations in the TES signal.

The spindle motor 4 is controlled in accordance with a revolution rate command corresponding to the determined degree of unbalance. The DSP 2 outputs a defect/shock signal to the CPU 3 when an attempted read of a pit is unsuccessful as a result of the pit escaping from the servo due to defects on the disk or other external impact. In other words, when the amplitude of the tracking error signal TES has a non-periodic, abnormal value, the DSP 2 forwards the detect/shock signal to the CPU 3 to indicate that the abnormal amplitude does not result from the unbalance of the disk, but instead results from other factors such as defects on the disk. Such an abnormality of the tracking error signal amplitude is exhibited in the form of an omission of the tracking error signal TES or, on the contrary, a sudden increase in amplitude.

Figure 3A:
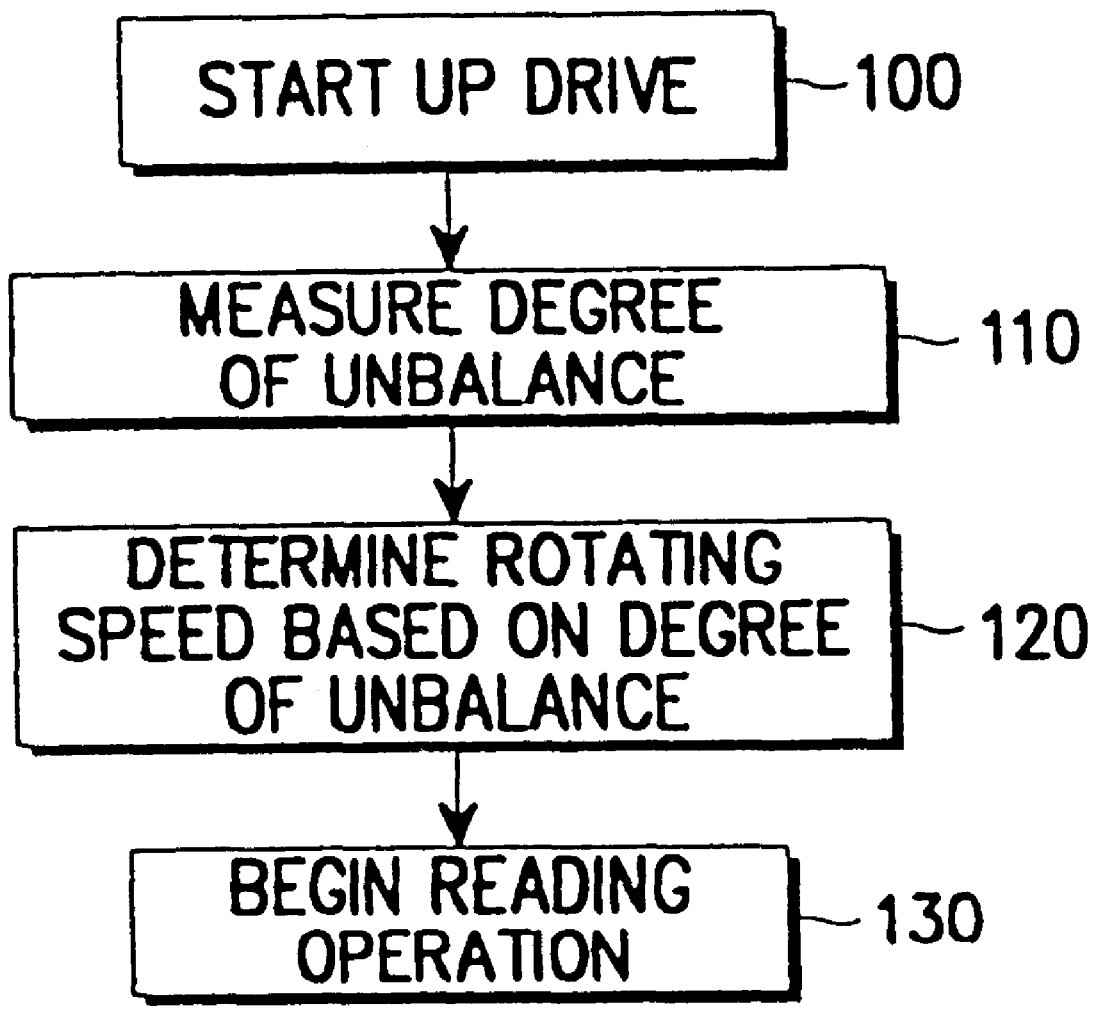
FIGS. 3A and 3B are flow charts illustrating respective methods for reading data from an unbalanced disk in accordance with differing embodiments of the present invention.
Figure 3B:
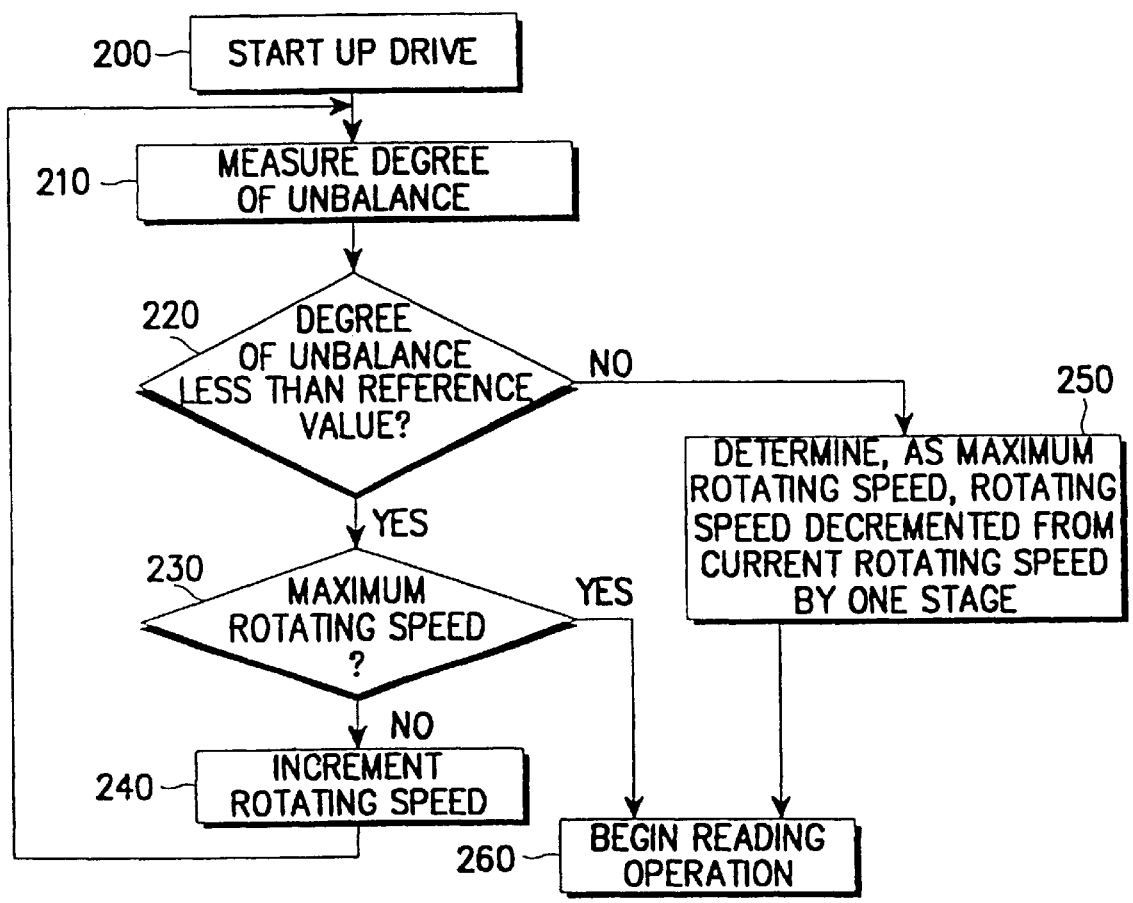

FIGS. 3A and 3B illustrate different embodiments of a method for reading data from an unbalanced disk in accordance with the present invention. In accordance with the embodiment of FIG. 3A, the CPU 3 starts up the disk drive at step 100 and then measures a degree of unbalance of the disk at step 110. That is, the disk drive is started up at a minimum rotating speed, i.e., a predetermined, low rotating speed. In this state, a tracking error signal TES generated from the pickup unit 1 is sent to CPU 3 which, in turn, measures the amplitude of the drive voltage associated with the tracking error signal TES. The measured amplitude of the drive voltage is determined as a degree of unbalance of the disk. After the measurement of the degree of unbalance, the procedure flows to step 120 at which the CPU 3 determines a suitable rotating speed of the disk drive. Maximum rotating speeds of the disk drive, each corresponding to a specific degree of unbalance, are stored in the CPU 3, such as in a table stored in memory thereof. Each corresponding rotating speed represents a maximum rotating speed for the measured degree of unbalance at which data can be successfully read, i.e., in an error-free manner. That is, a maximum rotating speed is the fastest speed at which error-free reading can be achieved, where "error-free" reading means a reading operation of which any data errors that occur can be corrected by error correction coding or other correction measures. Accordingly, the CPU 3 determines an appropriate rotating speed corresponding to the measured degree of unbalance. Based on the determined rotating speed, the CPU 3 sends the rotating speed control command to the spindle motor 4 to cause it to rotate at the determined rotation speed. At step 130, the CPU 3 begins data reading from the disk while continuing to output the rotating speed control command corresponding to the maximum rotating speed for the measured degree of unbalance.

In the embodiment of FIG. 3A, information defining the relationship between the degree of unbalance of the disk and a corresponding suitable rotating speed of the spindle motor 4 is previously stored in the CPU 3. Suitable rotating speeds as a function of degree of unbalance can be determined beforehand based on empirical measurements for the particular data reading system or on similar systems. That is, for various degrees of unbalance (or TES amplitudes) the system can be measured beforehand by determining the maximum rotating speed at which error-free reading occurs. This information is then stored in memory within CPU 3. Accordingly, a desired rotating speed of the disk can be determined immediately after the determination of the degree of unbalance of the disk. In this case, data reading is begun after the determination of the rotating speed as mentioned above.

In accordance with the embodiment of FIG. 3B, the CPU 3 starts up the disk drive at step 200 and then measures a degree of unbalance of the disk at step 210 in the same manner as that in the embodiment of FIG. 3A. After the measurement of the degree of unbalance, CPU 3 determines at step 220 whether or not the measured degree of unbalance is less than a reference value. If the measured degree of unbalance is less than the reference value, the CPU 3 determines at step 230 whether the current rotating speed is a maximum rotating speed. If so, data reading is commenced in step 260. If the current rotating speed is not the maximum rotating speed, it is incremented by one stage at step 240. Thereafter, the procedure returns to step 210 to again measure the degree of unbalance. On the other hand, when it is determined at step 220 that the degree of unbalance is more than the reference value, the procedure flows to step 250. At step 250, the current rotating speed is decremented by one stage, and the resultant rotating speed is determined as a maximum rotating speed. Thereafter, data reading is begun at step 260.

In the embodiment of FIG. 3B, an actual degree of unbalance is measured in association with the current rotating speed, and the maximum rotating speed is determined based on the measured degree of unbalance. Accordingly, it is possible to more definitively determine a desired rotating speed, as compared to the case of FIG. 3A. However, the time from the start-up of the disk drive to the data reading is longer because it is required to increment the rotating speed stepwise prior to beginning the read operation. In the embodiment of FIG. 3A, the disk drive is started up at a minimum rotating speed. Subsequently, a rotational speed corresponding to a degree of unbalance (measured when the disk drive is started up) is read out. The data read out at the read out rotating speed is considered a maximum rotating speed. In contrast, in the embodiment of FIG. 3B, rotating speed is determined by a degree of unbalance at a current rotating speed. As such the embodiment of FIG. 3B adapts more effectively to high speeds than the embodiment of FIG. 3A.

As is apparent from the above description, the present invention beneficially enables a stable data reading state to be obtained prior to the generation of reading errors, thereby achieving an effective data reading without any retry operations (or with a reduced number of retries). It is also possible to suppress the generation of vibrations during disk rotation, thus reducing or minimizing undesirable influences on other elements.

While this invention has been described in connection with what is presently considered to be the most practical and preferred embodiments, it is to be understood that the invention is not limited to the disclosed embodiments, but, on the contrary, it is intended to cover various modifications within the spirit and scope of the appended claims.

What is claimed is:

1. A method for adjusting the rotation speed of a disk, comprising the steps of:
   (a) measuring a degree of unbalance of said disk;
   (b) determining a maximum rotation speed based on the degree of unbalance;
   (c) measuring a current rotation speed of the disk;
   (d) comparing the degree of unbalance with a reference value;
   (e) decreasing by one stage the rotation speed of the disk if the degree of unbalance is not less than the reference value, and continuing with step (h);
   (f) comparing the maximum rotation speed with the current rotation speed;
   (g) increasing by one stage the rotation speed of the disk if the current speed is slower than the maximum rotation speed and returning to step (a), else continuing to step (h); and
   (h) beginning a reading operation.

2. The method in accordance with claim 1, wherein the degree of unbalance corresponds to the amplitude of a drive voltage of a tracking error signal for an error correction.

3. The method in accordance with claim 1, wherein when the amplitude of the tracking error signal has a non-periodic, abnormal value, it is determined that the degree of unbalance results from a factor other than an unbalance of said disk and the abnormal value is ignored in the determination of the maximum rotating speed.

4. The method in accordance with claim 1, wherein the maximum rotating speed is a maximum rotating speed to perform error-free reading.

* * * * *